US012172514B2

(12) United States Patent
Nakaya et al.

(10) Patent No.: US 12,172,514 B2
(45) Date of Patent: Dec. 24, 2024

(54) FUEL TANK

(71) Applicant: YACHIYO INDUSTRY CO., LTD., Saitama (JP)

(72) Inventors: Kazunari Nakaya, Tochigi (JP); Masaki Morisaki, Tochigi (JP); Kazuyoshi Morooka, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 18/290,929

(22) PCT Filed: Jul. 14, 2022

(86) PCT No.: PCT/JP2022/027650
§ 371 (c)(1),
(2) Date: Jan. 22, 2024

(87) PCT Pub. No.: WO2023/008205
PCT Pub. Date: Feb. 2, 2023

(65) Prior Publication Data

US 2024/0262182 A1 Aug. 8, 2024

(30) Foreign Application Priority Data

Jul. 26, 2021 (JP) ................................ 2021-121243

(51) Int. Cl.
*B60K 15/03* (2006.01)

(52) U.S. Cl.
CPC .... *B60K 15/03* (2013.01); *B60K 2015/03328* (2013.01)

(58) Field of Classification Search
CPC .......... B60K 2015/03032; B60K 2015/03493; B60K 2015/03328; B60K 2015/03467; B60K 15/03177; B60K 15/03
See application file for complete search history.

(56) References Cited

U.S. PATENT DOCUMENTS 6,338,420 B1 * 1/2002 Pachciarz ........ B60K 15/03177 220/4.13
11,235,658 B2 * 2/2022 Ryu ...................... B60K 15/03
(Continued)

FOREIGN PATENT DOCUMENTS

CN 106042904 A 10/2016
CN 110774890 A 2/2020
(Continued)

OTHER PUBLICATIONS

Written Opinion dated Sep. 20, 2022 and the International Preliminary Report dated Jan. 17, 2023 for PCT/JP2022/027650.
(Continued)

*Primary Examiner* — Shawn M Braden
(74) *Attorney, Agent, or Firm* — KENEALY VAIDYA LLP

(57) ABSTRACT

A fuel tank includes: an internal component including a head portion, a neck portion, and a shoulder portion. The internal component is fixed on the tank main body by shaping a parison to the head portion, the neck portion and the shoulder portion during molding of the tank main body. At least one of the head portion and the neck portion includes a bottom portion (a fuse-shaped portion) configured to be broken near a boundary between the head portion and the neck portion.

4 Claims, 13 Drawing Sheets

(56) References Cited

U.S. PATENT DOCUMENTS

| | | | |
|---|---|---|---|
| 2003/0201021 A1 | 10/2003 | Potter et al. | |
| 2006/0102634 A1 | 5/2006 | Potter et al. | |
| 2016/0243430 A1* | 8/2016 | Bailey | A63F 3/00574 |
| 2017/0101002 A1* | 4/2017 | Dudar | G01L 1/22 |
| 2018/0065475 A1* | 3/2018 | Amano | B60K 15/03177 |
| 2018/0118018 A1 | 5/2018 | Amano et al. | |
| 2019/0232780 A1* | 8/2019 | Jiang | B29C 49/18 |
| 2021/0138894 A1 | 5/2021 | Ryu | |
| 2023/0050517 A1* | 2/2023 | Nakaya | B60K 15/03177 |

FOREIGN PATENT DOCUMENTS

| | | | |
|---|---|---|---|
| CN | 112776588 | A | 5/2021 |
| JP | 2018-039470 | A | 3/2018 |
| JP | 2018-071502 | A | 5/2018 |
| JP | 2019-188895 | A | 10/2019 |
| KR | 20210012208 | A | 2/2021 |
| WO | 2018/225413 | A1 | 12/2018 |

OTHER PUBLICATIONS

Office Action for the corresponding Chinese patent application No. 202280047984.1 dated Apr. 25, 2024.

* cited by examiner

FUEL TANK

CROSS-REFERENCE TO RELATED APPLICATION

This application is a U.S. National Stage Application under 35 U.S.C § 371 of International Patent Application No. PCT/JP2022/027650 filed on Jul. 14, 2022, which claims the benefit of priority to Japanese Patent Application No. 2021-121243 filed on Jul. 26, 2021, the disclosures of all of which are hereby incorporated by reference in their entireties.

TECHNICAL FIELD

The present invention relates to a fuel tank.

BACKGROUND ART

A recognized method exists for affixing components, such as valves, to blow-molded products, notably automobile fuel tanks, as internal components. For example, Patent Literature 1 describes a method for manufacturing a fuel tank that integrates an internal component, which includes a head portion, neck portion, and shoulder portion. Within this method of fuel tank fabrication, the parison is shaped along the neck portion by sending in air from the exterior of the parison during the tank main body molding process, thus anchoring the internal component to the tank main body.

CITATION LIST

Patent Document

Patent Document 1: International Publication No. WO2018/225413

SUMMARY OF INVENTION

Technical Problem

When the pressure inside the fuel tank increases, causing the tank main body to deform under positive pressure, there is a risk that the wall portion of the tank main body near the neck portion could be broken.

Therefore, an object of the present invention is to provide a fuel tank that can prevent breakage of the wall portion of the tank main body.

Solution to Problem

To achieve the aforementioned object, the present invention is a fuel tank which includes an internal component including a head portion, a neck portion, and a shoulder portion, the internal component being fixed on a tank main body by shaping a parison to the head portion, neck portion, and shoulder portion during molding of the tank main body. At least one of the head portion and the neck portion includes a fuse-shaped portion to be broken near a boundary between the head portion and neck portion. The head portion is formed with multiple cutout portions opening to an end surface of the head portion, and fuse-shaped portions are formed on radially outer side of the head portion and continuously with the multiple cutout portions.

The present invention is fuel tank which includes an internal component including a head portion, a neck portion, and a shoulder portion, the internal component being fixed on the tank main body by shaping a parison to the head portion, the neck portion and the shoulder portion during molding of the tank main body. At least one of the head portion and the neck portion includes a fuse-shaped portion to be broken near a boundary between the head portion and the neck portion. Multiple cutout portions are formed to communicate from the head portion to the neck portion and open to an end surface of the head portion. Fuse-shaped portions are formed on radially outer side of the neck portion and continuously with the multiple cutout portions.

According to the present invention, by having the fuse-shaped portion, when a predetermined positive pressure is applied, the internal component can be broken near the boundary between the head portion and neck portion. As a result, the broken portion remains on the wall portion of the tank main body, and the other portions can be detached from the wall portion of the tank main body, thereby preventing damage to the wall portion of the tank main body. According to the present invention, use of the cutout portions allows for easy formation of the fuse-shaped portions.

The present invention is a fuel tank which includes an internal component including a head portion, a neck portion, and a shoulder portion, the internal component being fixed on the tank main body by shaping a parison to the head portion, the neck portion and the shoulder portion during molding of the tank main body. At least one of the head portion and the neck portion includes a fuse-shaped portion to be broken near a boundary between the head portion and the neck portion. The head portion includes a bottom portion to be the fuse-shaped portion, and a side wall standing from the bottom portion. The bottom portion has a constant thickness in a circumference direction.

The present invention is a fuel tank which includes an internal component including a head portion, a neck portion, and a shoulder portion, the internal component being fixed on the tank main body by shaping a parison to the head portion, the neck portion and the shoulder portion during molding of the tank main body. At least one of the head portion and the neck portion includes a fuse-shaped portion to be broken near a boundary between the head portion and the neck portion. The neck portion includes a side wall to be the fuse-shaped portion. The side wall has a constant thickness in a circumference direction.

According to the present invention, by having the fuse-shaped portion, when a predetermined positive pressure is applied, the internal component can be broken near the boundary between the head portion and neck portion. As a result, the broken portion remains on the wall portion of the tank main body, and the other portions can be detached from the wall portion of the tank main body, thereby preventing damage to the wall portion of the tank main body.

Advantageous Effects of Invention

The present invention makes it possible to prevent breakage of the wall portion of the tank main body.

BRIEF DESCRIPTION OF DRAWINGS

FIG. 10A shows the injection process of the parison, FIG. 10B shows the insertion process of the internal component, and FIG. 10C shows the temporary setting process of the internal component.

FIG. 11A shows the closing process of the mold, FIG. 11B shows the blow molding process, FIG. 11C shows the cooling process of the parison, and FIG. 11D shows the opening process of the mold.

DESCRIPTION OF EMBODIMENTS

<<Fuel Tank According to Embodiment>>

Figure 1:
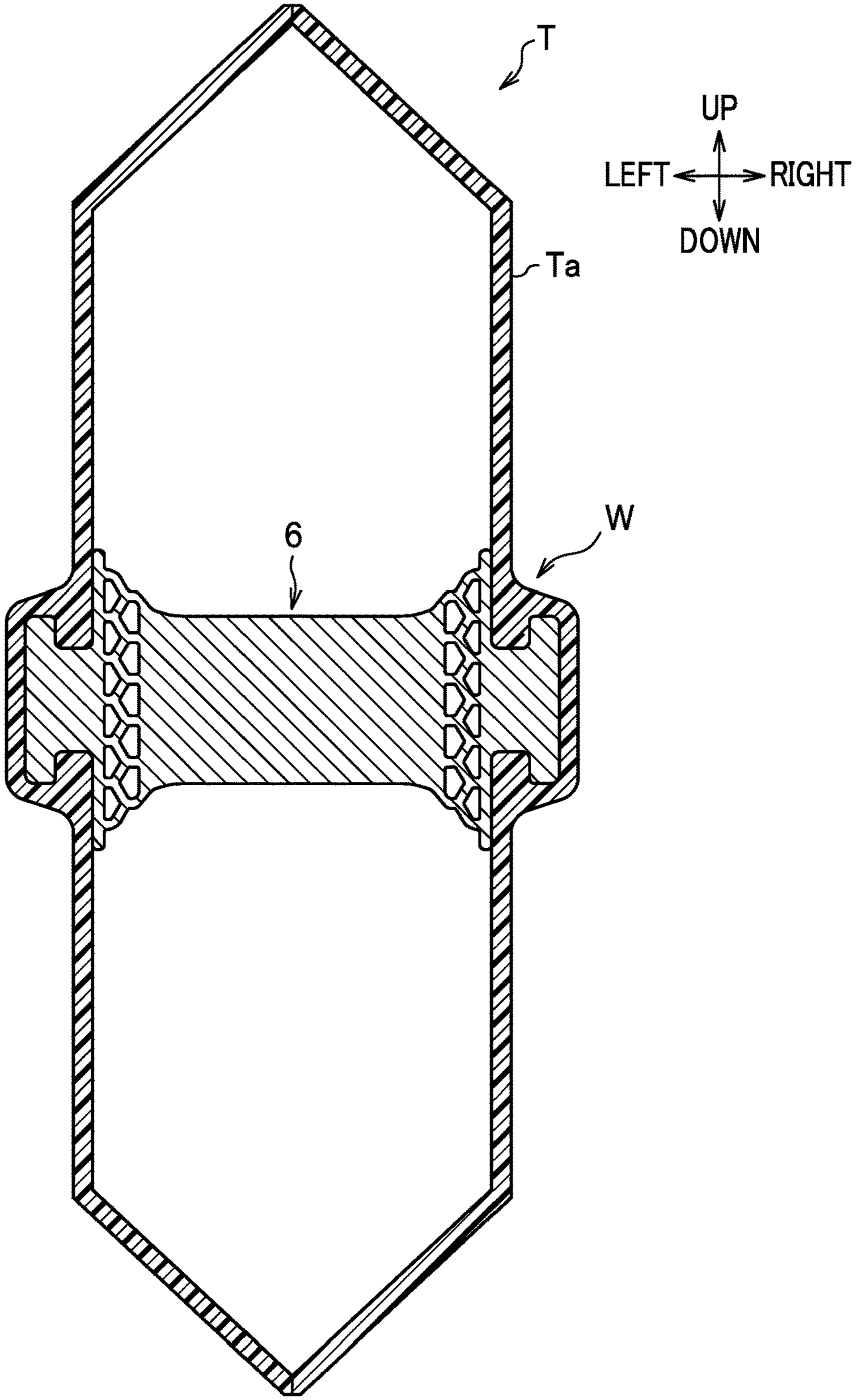
FIG. 1 is a schematic cross-sectional view of a fuel tank according to an embodiment of the present invention.

The fuel tank T shown in FIG. 1 is intended for installation in vehicles such as automobiles, motorcycles, and boats, and mainly includes a tank main body Ta and an internal component 6. As shown in FIG. 1, the present embodiment exemplifies a columnar reinforcement member as the internal component 6 to maintain the strength of the fuel tank T, but the internal component 6 can also be a valve or a wave damping plate. The terms "up and down" and "left and right" in the following description refer to the arrows in FIG. 1. Each direction is defined for the convenience of the description and does not limit the present invention. The left and right directions in FIG. 1 correspond to the opening and closing directions of a pair of molds used to manufacture the fuel tank T.

The tank main body Ta is a hollow container made of resin for storing fuels such as gasoline, and has a multilayered structure that includes a barrier layer, for example. The tank main body Ta is primarily made of thermoplastic resin such as polyethylene or high-density polyethylene. The tank main body Ta is formed, for instance, by blow molding.

In reference to FIGS. 2 through 6A and 6B, the composition of the internal component 6 will be described. The internal component 6 may be made of either a material that can be welded to the precursor of the tank main body Ta, a parison S (see FIG. 7) (for example, thermoplastic resins such as PE (polyethylene)) or a material that cannot be welded (such as POM (polyacetal)). The parison S has a structure made of multilayered HDPE (high-density polyethylene), EVOH (ethylene-vinyl alcohol copolymer), adhesive layers, and the like.

Figure 2:
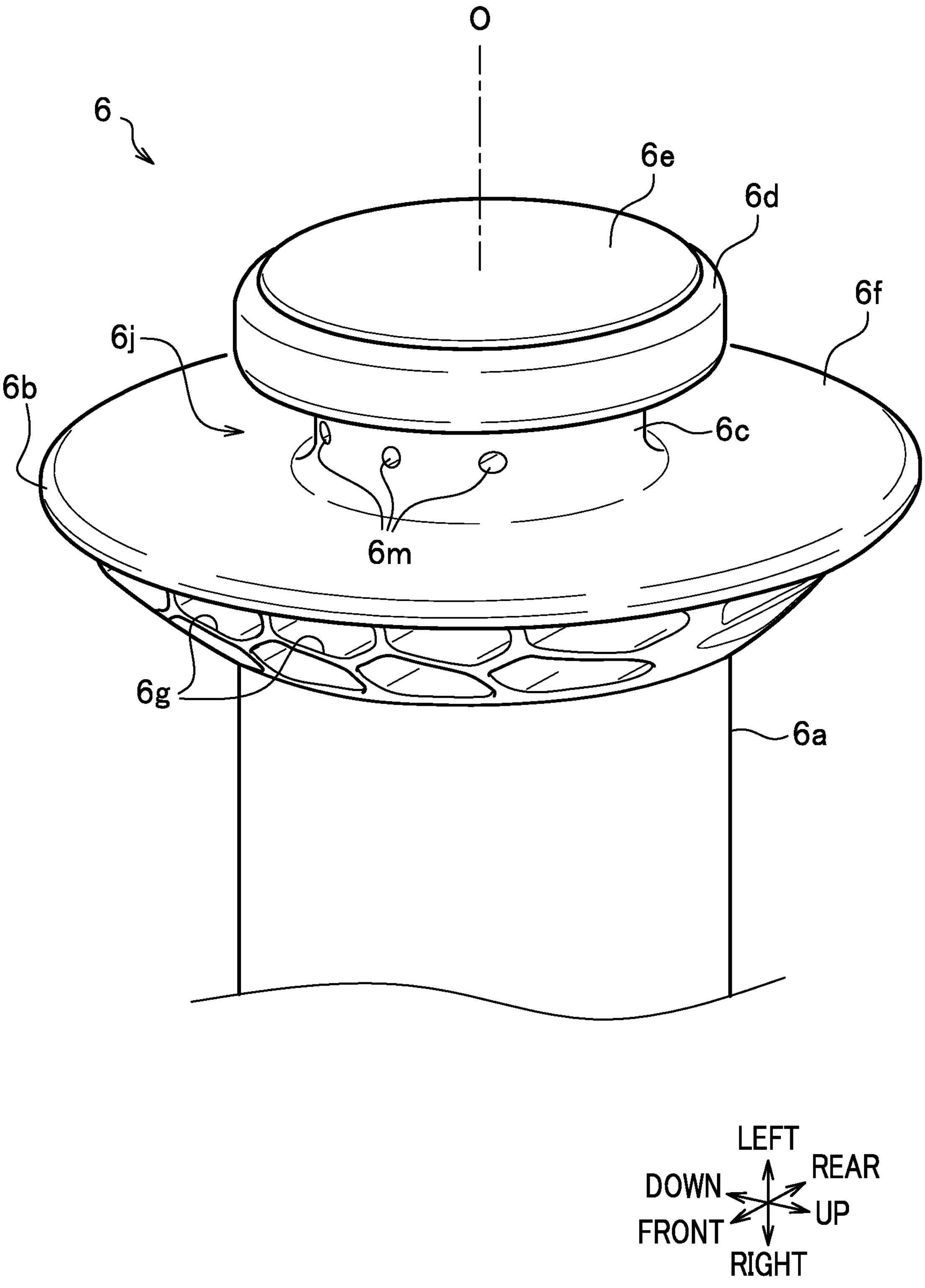
FIG. 2 is an external perspective view of an internal component.

As shown in FIG. 2, the internal component 6 includes a torso portion **6*a*, shoulder portions 6*b*, 6*b* formed at both ends of the torso portion 6*a*, neck portions 6*c*, 6*c* formed outside of the shoulder portions 6*b*, 6*b*, and head portions 6*d*, 6*d*. The structure of the internal component 6 is symmetrical in left and right (up and down on the paper). Therefore, unless explicitly stated, only one side will be described here. In the description of the internal component 6, the surface facing the torso portion 6*a*** is referred to as the "back surface," and the surface opposite to the "back surface" is referred to as the "front surface."

The torso portion **6*a* shown in FIG. 2 is a portion corresponding to the main body of the internal component 6. The torso portion 6*a* has a cylindrical shape, and the distal end thereof radially expands as it approaches the shoulder portion 6*b*. Multiple hollowing holes 6*g* are formed at the end portion of the torso portion 6*a*. The hollowing holes 6*g* are places where air circulates while the later-described parison S is shaped into the internal component 6**.

Figure 7:
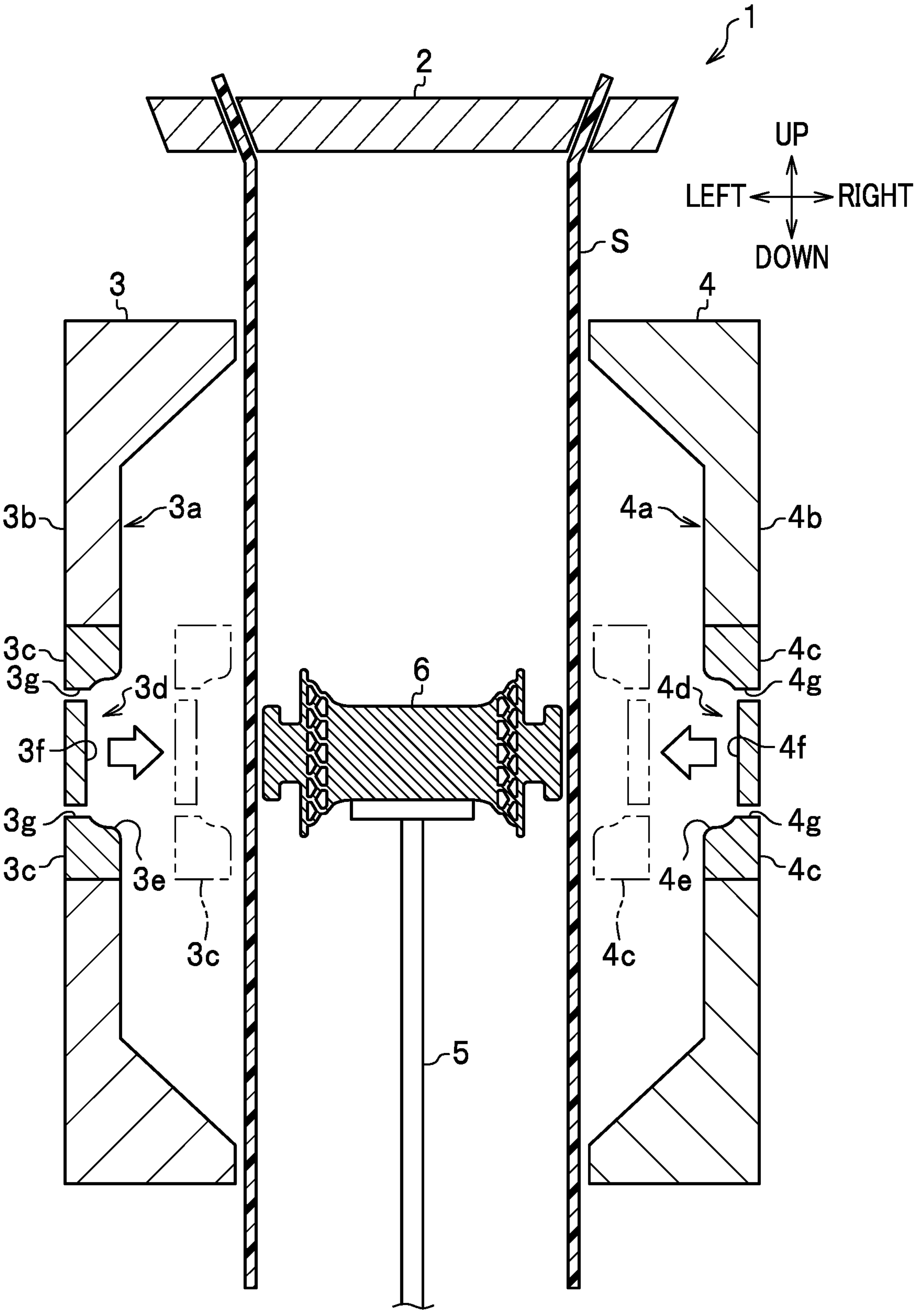
FIG. 7 is a schematic longitudinal cross-sectional view of a fuel tank manufacturing device.

The shoulder portion **6*b* shown in FIG. 2 covers the recess 3*d* of the first mold 3 or the recess 4*d* of the second mold 4, shown in FIG. 7. The shape and size of the shoulder portion 6*b* are not particularly limited, as long as they can cover the recesses 3*d*, 4*d*. Here, the shoulder portion 6*b* has a thin circular plate shape, and as shown in FIG. 3, the outer diameter rb of the shoulder portion 6*b* is larger than the outer diameter ra of the torso portion 6*a***.

Figure 3:
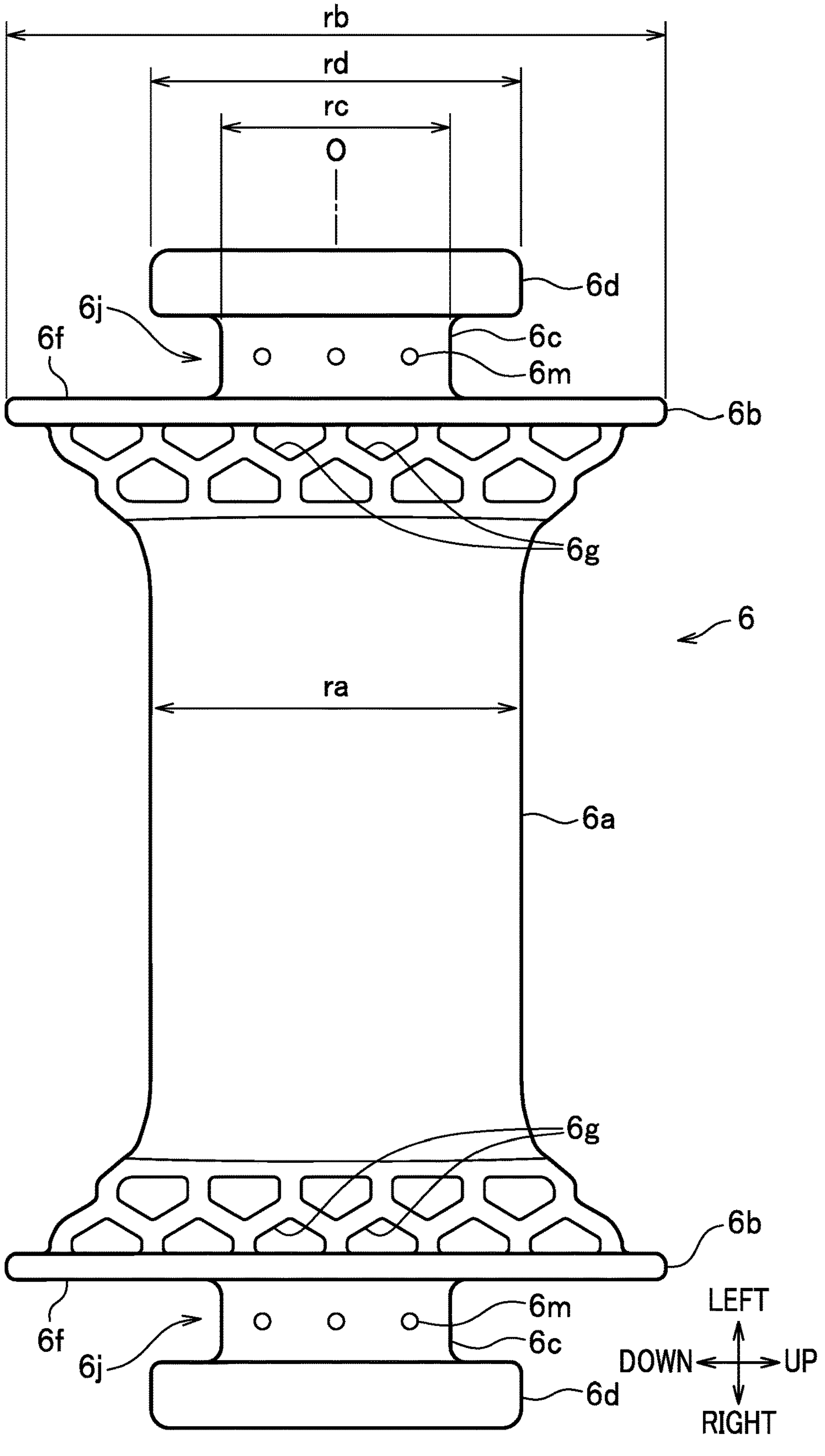
FIG. 3 is a front view of the internal component.

The neck portion **6*c* shown in FIG. 2 is a portion connecting the shoulder portion 6*b* and the head portion 6*d*, and as shown in FIG. 3, the neck portion 6*c* has a smaller diameter than the shoulder portion 6*b* and the head portion 6*d*. The neck portion 6*c* here stands from the surface 6*f* of the shoulder portion 6*b* and has a cylindrical shape. Rounded corners (radii) are formed in the corner portions formed by the shoulder portion 6*b* and the neck portion 6*c* and the corner portions formed by the head portion 6*d* and the neck portion 6*c***.

As shown in FIG. 2, multiple communication portions (first communication portions) **6*m* are formed in the neck portion 6*c* along the circumferential direction. Each communication portion 6*m* is a hole connecting the outside of the neck portion 6*c* and the cutout portion 6*k* (see FIG. 5). The communication portion 6*m* serves as an air release path for discharging air within the gap 6*j* when the parison S enters the gap 6*j* (described later) during molding. As long as the communication portion 6*m*** can discharge air, its shape, number, and the like are not specifically limited.

The head portion **6*d* shown in FIG. 2 has the shape of a thick circular plate, thicker than the shoulder portion 6*b*. Note that the relationship in thickness between the shoulder portion 6*b* and the head portion 6*d* here is merely an example, and the shoulder portion 6*b* may be formed thicker than the head portion 6*d*. As shown in FIG. 3, the outer diameter rd of the head portion 6*d* is larger than the outer diameter rc of the neck portion 6*c*, and smaller than the outer diameter rb of the shoulder portion 6*b*. With this shape, a gap 6*j* is formed between the shoulder portion 6*b* and the head portion 6*d*, with the neck portion 6*c* as the bottom portion. The gap 6*j*** is a place where the parison S enters during molding.

The shape and size of the head portion **6*d* are not particularly limited as long as the parison S can enter the periphery of the head portion 6*d* and the neck portion 6*c*, fixing the internal component 6 inside the tank body Ta (see FIG. 1). The portion corresponding to the parison wrapped around the neck portion 6*c* is called the "parison equivalent portion W" (see FIG. 9**).

Figure 4:
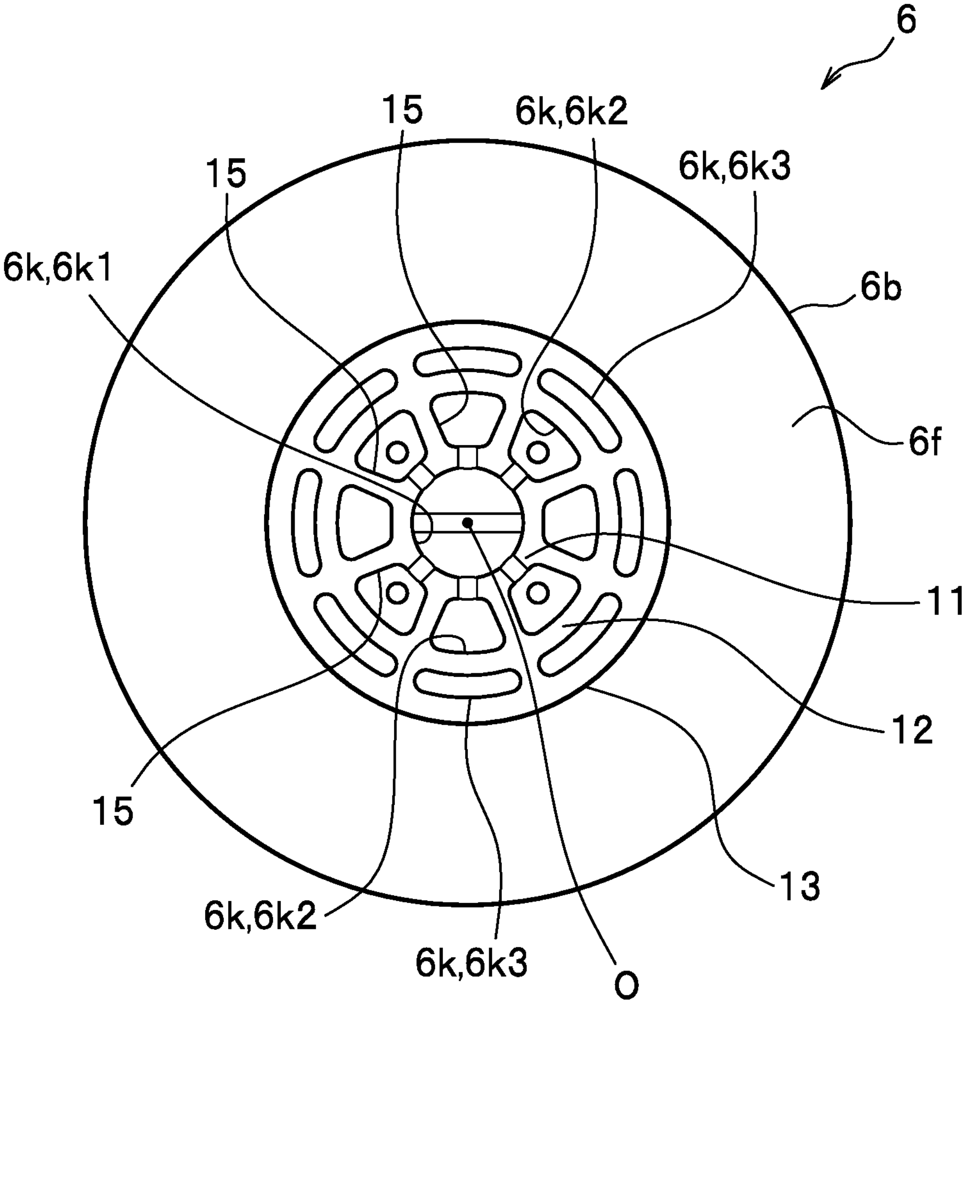
FIG. 4 is a plan view of the internal component.
Figure 5:
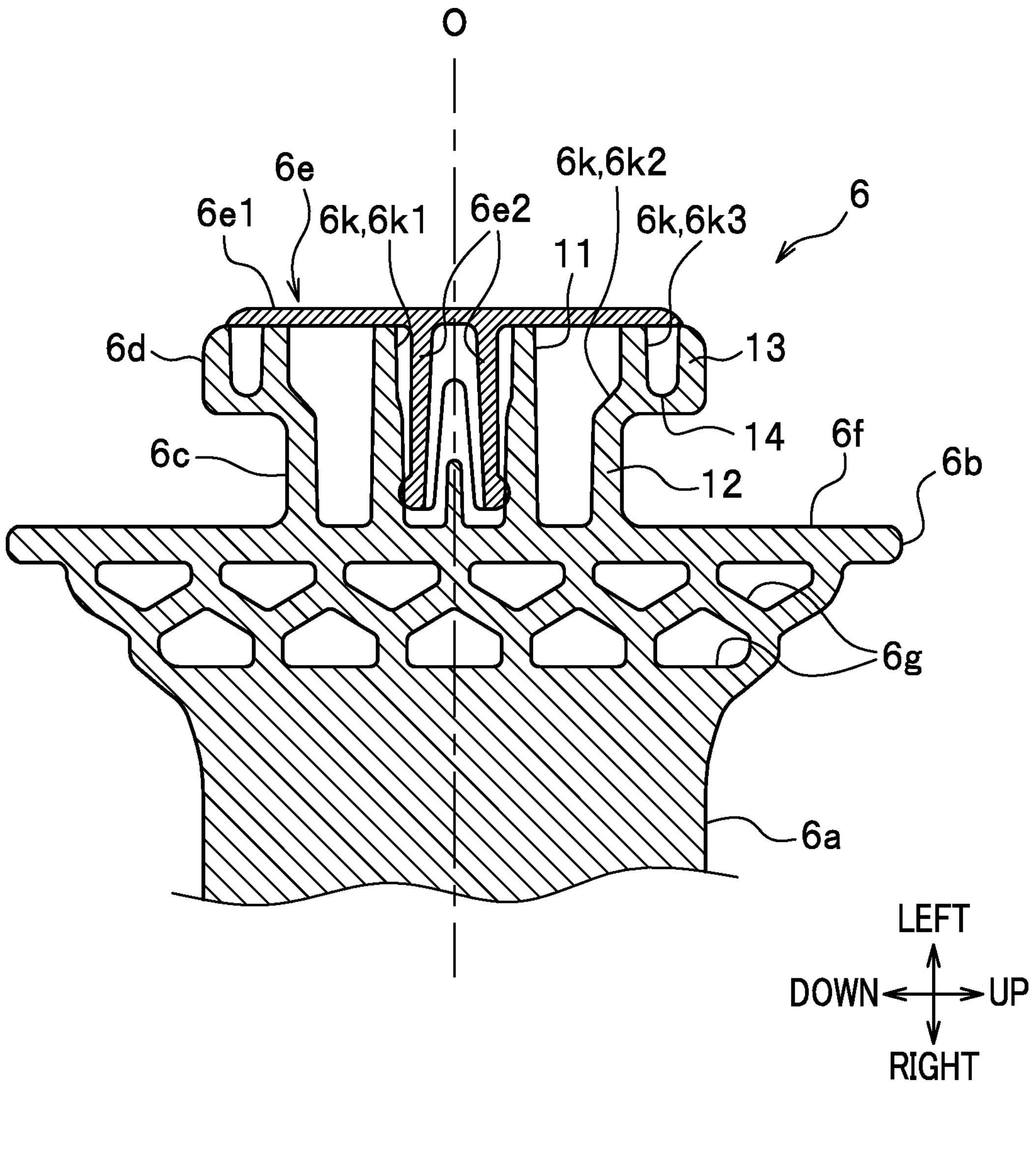
FIG. 5 is an enlarged sectional view of the internal component.
Figure 6A:
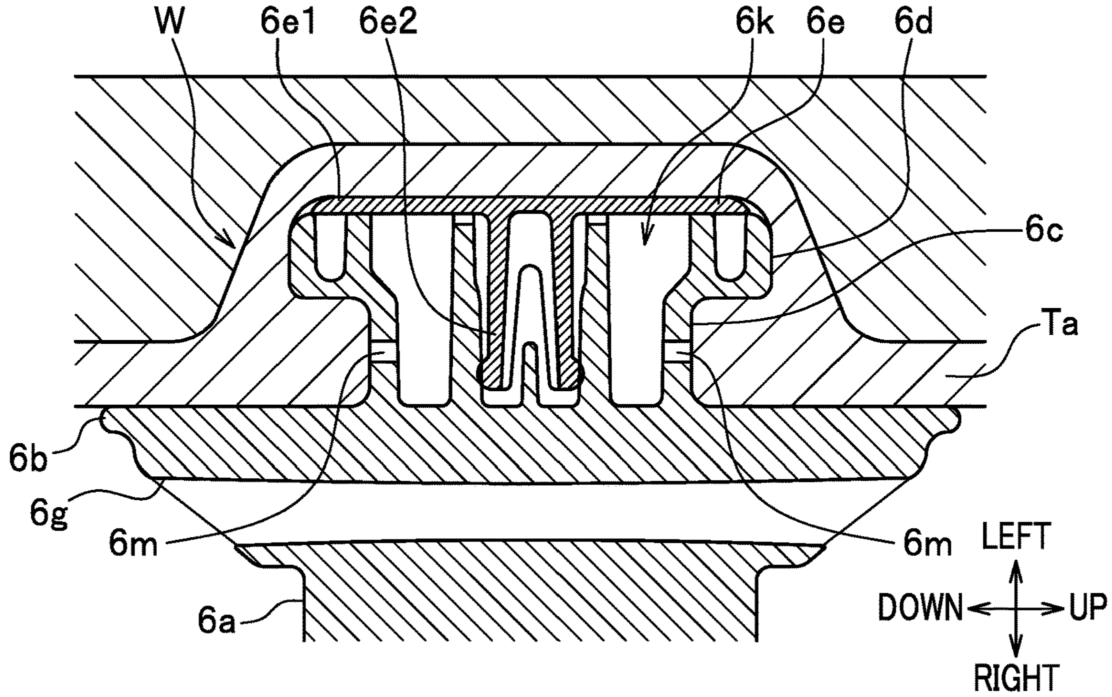
FIG. 6A is an enlarged sectional view of an end surface of a construction in which the internal component is fixed on the fuel tank.
Figure 6B:
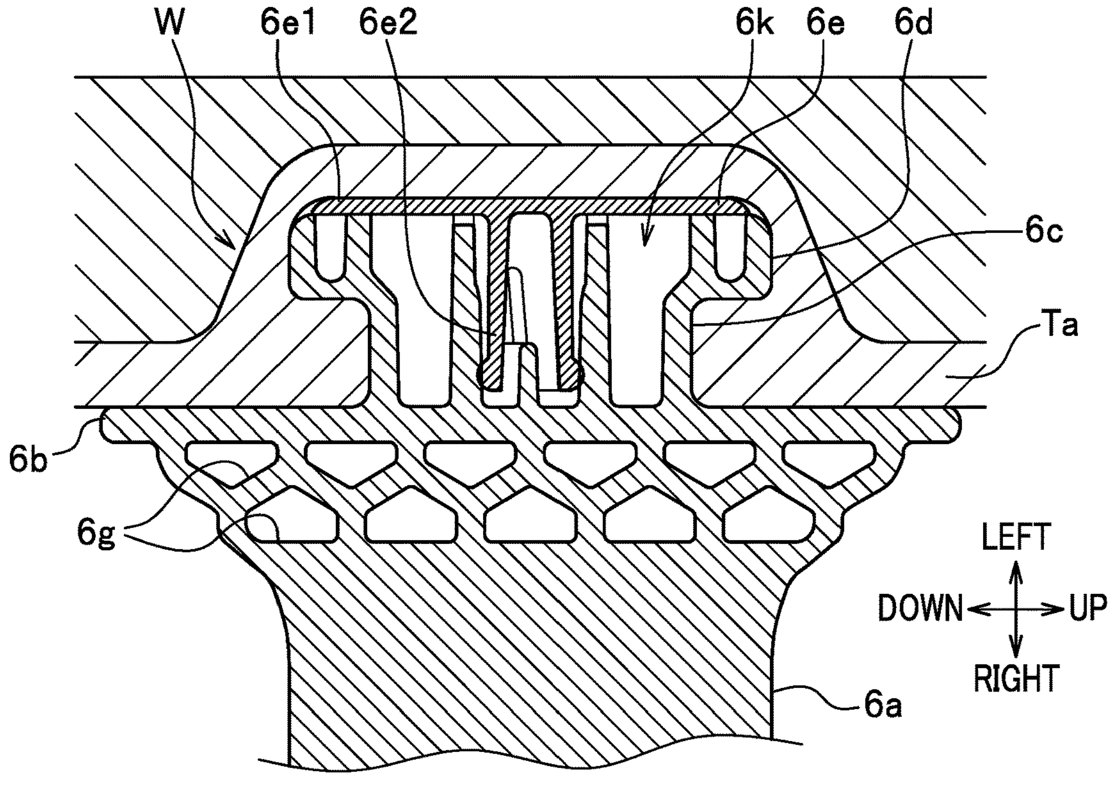
FIG. 6B is an enlarged sectional view of another end surface of the construction in which the internal component is fixed on the fuel tank.

As shown in FIGS. 4 and 5, multiple cutout portions 6*k* are formed inside the neck portion 6*c* and the head portion 6*d*. The neck portion 6*c* and the head portion 6*d* include a first side wall 11, a second side wall 12, a third side wall 13, a bottom portion 14, and multiple ribs 15. The first side wall 11 has a cylindrical shape and stands vertically from the center of the shoulder portion 6*b*.

The second side wall 12 is substantially has a cylindrical shape and stands vertically from the shoulder portion 6*b* on the outside of the first side wall 11. The first side wall 11 and the second side wall 12 are of the same height and are provided from the neck portion 6*c* to the head portion 6*d*.

The third side wall 13 has a cylindrical shape and stands vertically from the bottom portion 14 on the outside of the second side wall 12. The bottom portion 14 protrudes laterally in the circumferential direction from the outer surface of the second side wall 12. The height of the third side wall 13 is about half of the second side wall 12. The ribs 15 extend radially with respect to the central axis O, continuing from the first side wall 11 to the third side wall 13. By providing the ribs 15, it is possible to prevent the inclination of the first side wall 11, the second side wall 12, and the third side wall 13 and to enhance the strength thereof.

Multiple cutout portions 6*k* are formed inside the neck portion 6*c* and head portion 6*d* of the aforementioned structures. When molding the internal component 6, there is a possibility that the resin at the end surface of the head portion 6*d* may shrink, causing the end surface to become concave. However, by providing a cutout portion 6*k* opening on that end surface, the resin during molding is easier to control, and molding accuracy can be improved. The cutout portion 6*k* includes a first cutout portion 6*kl*, multiple second cutout portions 6*k*2, and multiple third cutout portions 6*k*3. The first cutout portion 6*kl* is provided in the center portion and is a space enclosed by the shoulder portion 6*b* and the first side wall 11.

The second cutout portion 6*k*2 is a space enclosed by the shoulder portion 6*b*, the first side wall 11, the second side wall 12, and adjacent ribs 15, 15. The multiple second cutout portions 6*k*2 (eight in the present embodiment) are provided on the outside of the first cutout portion 6*kl* in the circumferential direction.

The third cutout portion 6*k*3 is a space enclosed by the bottom portion 14, the second side wall 12, the third side wall 13, and adjacent ribs 15, 15. The multiple third cutout portions 6*k*3 (eight in the present embodiment) are provided on the outside of the second cutout portions 6*k*2 in the circumferential direction. Although the second cutout portions 6*k*2 and the third cutout portions 6*k*3 are formed in eight pieces each in the present embodiment, the number can be set as appropriate.

As shown in FIG. 5, the bottom portion 14 is formed continuously with the third cutout portion 6*k*3 that opens upwards. The bottom portion 14 is a portion serving as a "fuse-shaped portion" for being broken near the boundary between the neck portion 6*c* and the head portion 6*d*. That is, the bottom portion 14 is formed such that it is broken when positive pressure is applied inside the fuel tank 1 and a predetermined stress acts on the bottom portion 14. By adjusting the thickness (length in the direction of the central axis O) of the bottom portion 14, it can be broken with the desired stress. The thickness (fuse-shaped portion) of the bottom portion 14 may vary in the circumferential direction, but it is preferable that the thickness thereof is constant as in the present embodiment. This can prevent stress from concentrating on the bottom portion 14 under normal conditions.

The cap member 6*e* shown in FIG. 5 is a member that is placed on the end surface of the head portion 6*d* to seal the opening of the cutout portion 6*k*. By sealing the opening of the cutout portion 6*k*, the cap member 6*e* can prevent the parison S from entering the cutout portion 6*k* during molding. The material of the cap member 6*e* is not particularly limited, but in the present embodiment, for example, it is made of the same material as the internal component 6.

As shown in FIG. 5, the cap member 6*e* includes a lid portion 6*el* and a leg portion 6*e*2. When the lid portion 6*e*1 is placed to seal the opening of the first cutout portion 6*k*1, the leg portion 6*e*2 is inserted into and engages with the first cutout portion 6*kl*. By engaging the leg portion 6*e*2 inside the first cutout portion 6*kl*, the lid portion 6*e*1 can be prevented from rotating and fixed.

The lid portion 6*el* has a flat surface and seals the opening of all the cutout portions 6*k*, playing a role in preventing the flow of parison S and the like into the cutout portions 6*k*. The shape of the lid portion 6*el* can be any shape that can seal the opening of the cutout portion 6*k*, and may be appropriately set according to the shape of the head portion 6*d*. Also, if there is another mechanism that can fix the lid portion 6*e*1, the leg portion 6*e*2 may be omitted.

<<Method for Manufacturing Fuel Tank According to Embodiment>>

The fuel tank manufacturing device 1 shown in FIG. 7 is a device that blow-molds a cylindrical parison S to produce a fuel tank T having an internal component 6 (see FIG. 1). Additionally, the fuel tank T can also be manufactured by molding a sheet-shaped parison (not shown).

As shown in FIG. 7, the fuel tank manufacturing device 1 mainly includes a die 2, a pair of first mold 3 and second mold 4, and an elevator 5 that moves up and down between the first mold 3 and the second mold 4.

The die 2 is located above the first mold 3 and second mold 4 and is a supply means for supplying the parison S to the first mold 3 and second mold 4. The parison S has a multilayered structure composed of HDPE (high-density polyethylene), EVOH (ethylene-vinyl alcohol copolymer), adhesive layers, and the like, and is a precursor of the tank main body Ta that constitutes the fuel tank T (see FIG. 1).

The first mold 3 and second mold 4 shown in FIG. 7 are molding means for compression-molding the fuel tank T (see FIG. 1). The first mold 3 and second mold 4 are arranged facing each other, and concave molding portions 3*a*, 4*a* are formed on their opposing surfaces. The first mold 3 and second mold 4 can open and close by moving in the left-right direction, and the parison S is supplied when the first mold 3 and the second mold 4 are in an open state (state as shown in FIG. 7). Also, the first mold 3 and second mold 4 include not-shown blow pins to send in air to the first mold 3 and second mold 4, and the air pressure (blow pressure) inside the first mold 3 and second mold 4 is properly adjusted by a not-shown first positive pressure applying means. This first positive pressure applying means allows for transfer of the parison S to the molding portions 3*a*, 4*a*.

The first mold 3 is constructed to separate, and includes a main body portion 3*b* and a separable portion 3*c* that can be detached from the main body portion 3*b*. Similarly, the second mold 4 is constructed to separate, and includes a main body portion 4*b* and a separable portion 4*c* that can be detached from the main body portion 4*b*. The separable portions 3*c*, 4*c* are provided with recesses 3*d*, 4*d* formed therein, which correspond to the shapes of both ends of the internal component 6, and these recesses 3*d*, 4*d* accommodate a part of the internal component 6. The recesses 3*d*, 4*d* here have a cylindrical shape. Additionally, in the bottom portion 3*f*, 4*f* of the recesses 3*d*, 4*d*, multiple air holes 3*g*, 4*g* are formed to send in air to the recesses 3*d*, 4*d*, respectively, and the air pressure (blow pressure) inside the recesses 3*d*, 4*d* is properly adjusted by a not-shown second positive pressure applying means.

The elevator 5 is a moving means for moving the internal component 6 to its installation position. The installation position here is inside the cylindrical parison S, and is between the separable portions 3*c*, 4*c*.

Next, the operation of the fuel tank manufacturing device 1 will be described. Before explaining the entire process of manufacturing the fuel tank T (see FIG. 1) by the fuel tank manufacturing device 1, the transfer status around the end portions of the internal component 6 will be described.

<Transfer Status Around End Portions of Internal Component>

In reference to FIGS. 8 and 9 (and FIGS. 1 to 7 as appropriate), the transfer status of the parison S around the end portions of the internal component 6 during molding will be described. Note that here, the first mold 3 will be described, but the second mold 4 is similar.

Figure 8:
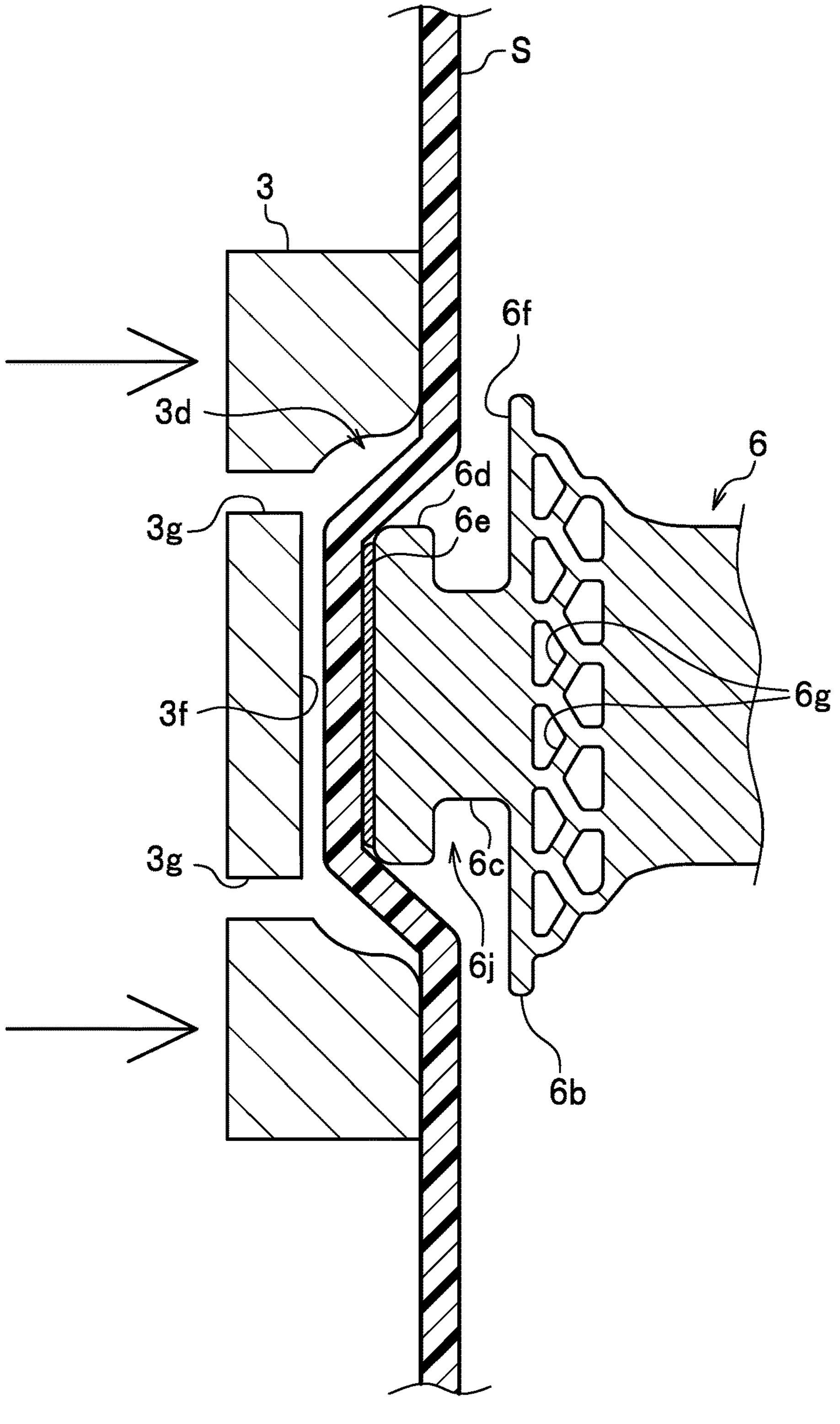
FIG. 8 is a diagram for explaining the transfer status of the parison around the end portion of the internal component during molding.

In the fuel tank manufacturing process, as shown in FIG. 8, by moving the first mold 3 in the arrow direction and clamping, the neck portion 6*c* and head portion 6*d* of the internal component 6 are pushed into the recess 3*d* together with the parison S.

Figure 9:
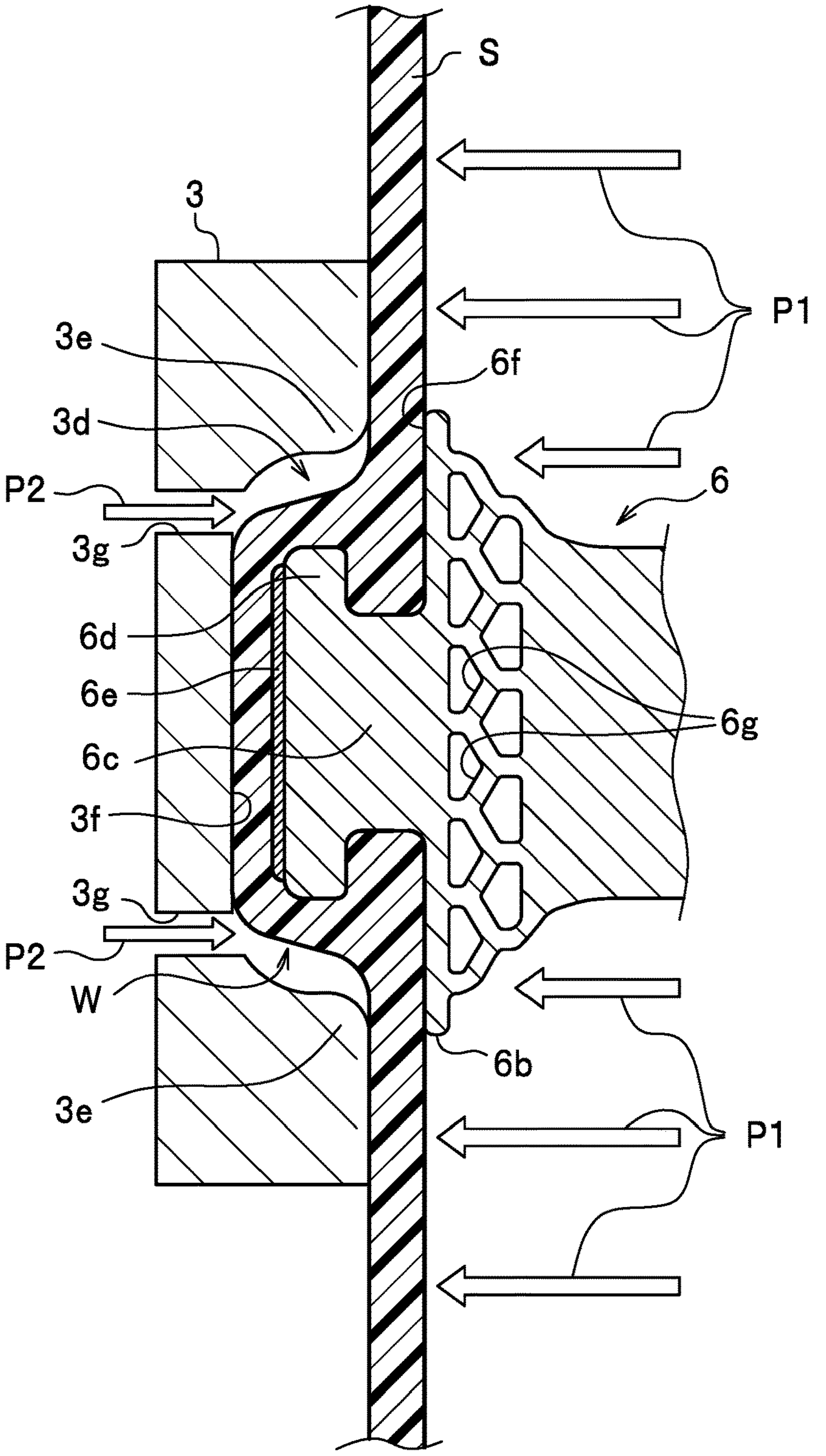
FIG. 9 is a diagram for explaining the transfer status of the parison around the end portion of the internal component during molding.

As shown in FIG. 9, when the shoulder portion 6*b* contacts the parison S to cover the opening of the recess 3*d*, and the neck portion 6*c* and head portion 6*d* are completely pushed into (housed in) the recess 3*d*, a positive pressure P1 (first positive pressure) is generated inside the parison S by sending air into the first mold 3, transferring the parison S to the first mold 3. In addition, by sending air into the recess 3*d* through the air holes 3*g* formed in the recess 3*d*, a positive pressure P2 (second positive pressure) is generated inside the recess 3*d* to allow the parison S to enter the gap 6*j* between the shoulder portion 6*b* and the head portion 6*d* for transfer. The air in the gap 6*j* is, as described above, discharged into the interior of the tank main body Ta by appropriately passing through the communication portions (the first communication portions) 6*m*, the cutout portions 6*k*, the communication portions penetrating the shoulder portion 6*b* (not shown), and the hollowing holes 6*g*.

Next, the overall process of the fuel tank manufacturing device 1 will be described.

<Parison Injection Process>

Figure 10A:
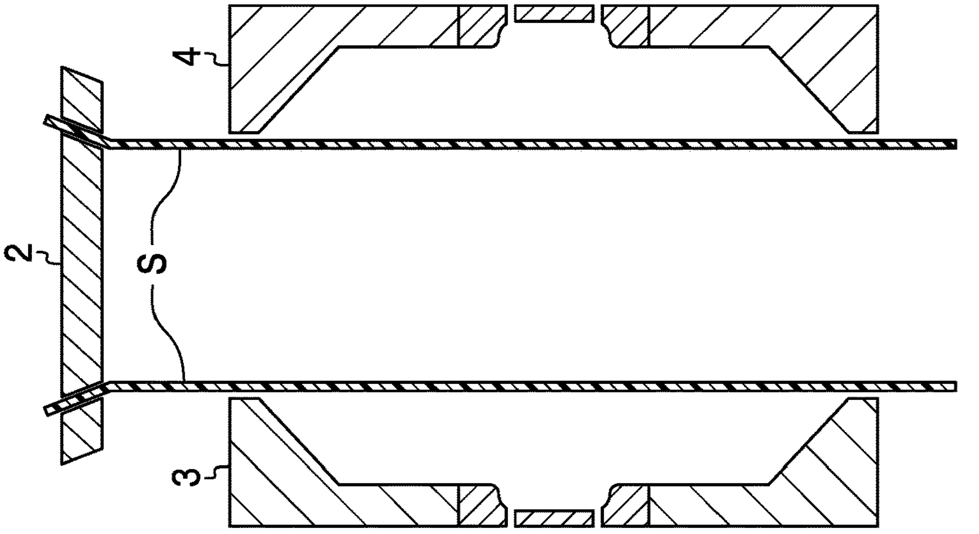
FIGS. 10A to 10C are each a diagram for explaining the method for manufacturing a fuel tank in the fuel tank manufacturing device, where

As shown in FIG. 10A, the die 2 injects a cylindrical parison S between the first mold 3 and the second mold 4 in an open state.

<Internal Component Insertion Process>

Figure 10B:
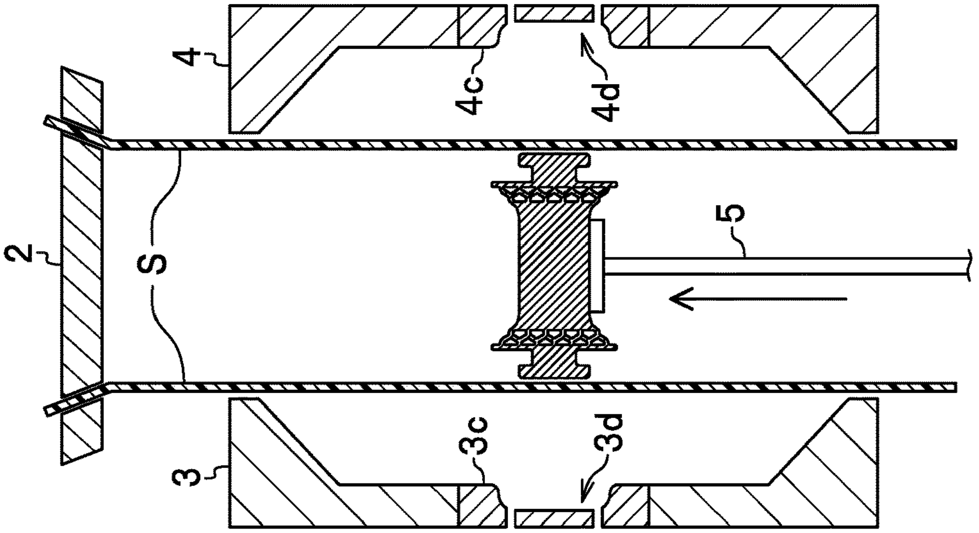

Next, as shown in FIG. 10B, the elevator 5 rises with the internal component 6 held, and moves the internal component 6 to the attachment position. Here, the attachment position is inside the parison S and between the separable portions 3*c*, 4*c*.

<Internal Component Temporary Setting Process>

Figure 10C:
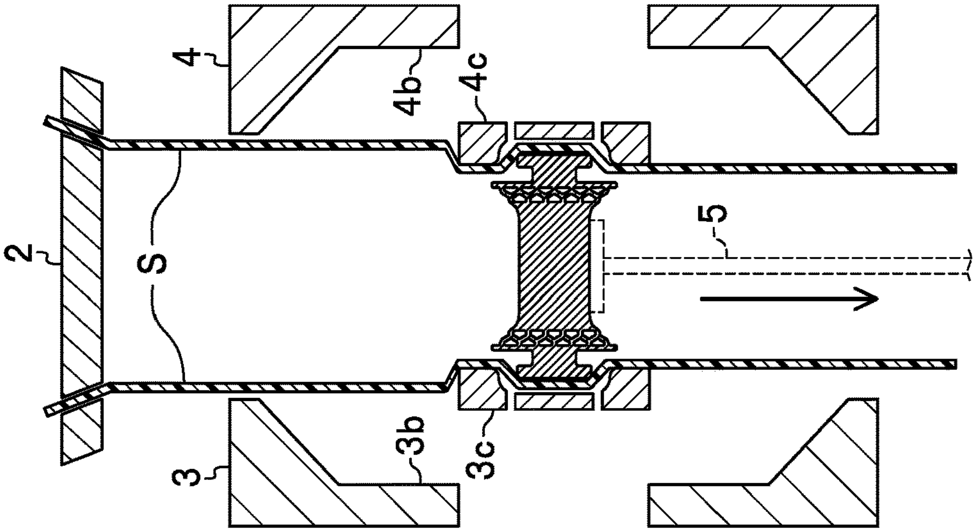

Next, as shown in FIG. 10C, the separable portions 3*c*, 4*c* of the first mold 3 and second mold 4 move in directions facing each other to hold the internal component 6 by sandwiching it from both ends. Then, the elevator 5 descends with the internal component 6 released and retreats to the initial position. The initial position of the elevator 5 may be any position that does not interfere when the main body portions 3*b*, 4*b* of the first mold 3 and second mold 4 are closed.

<Mold Closing Process>

Figures 11A, 11B, 11C, 11D:
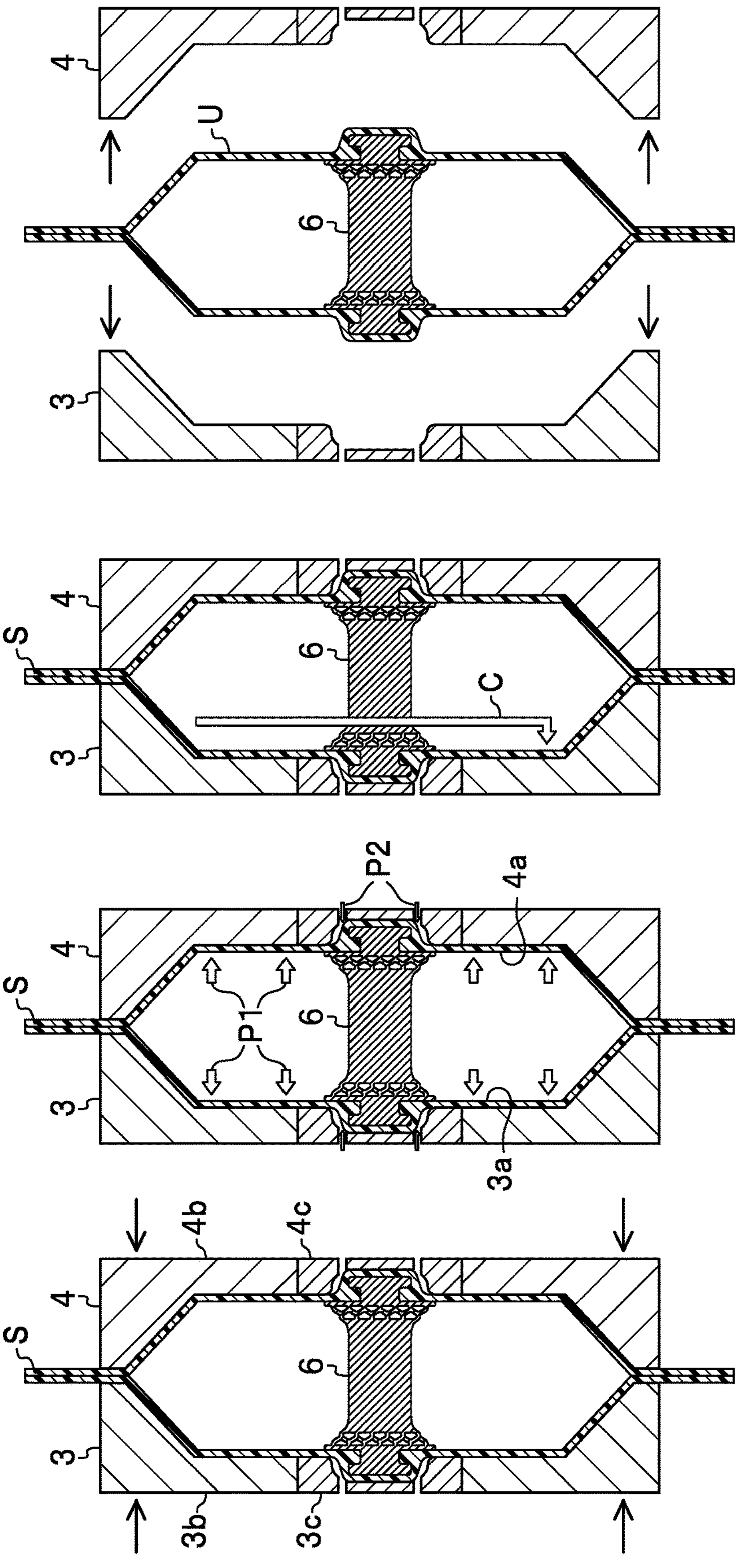
FIGS. 11A to 11D are each a diagram for explaining the method for manufacturing a fuel tank in the fuel tank manufacturing device, where

Next, as shown in FIG. 11A, the main body portions 3*b*, 4*b* of the first mold 3 and second mold 4 move in directions facing each other, and the first mold 3 and second mold 4 are clamped.

<Blow Molding Process>

Next, as shown in FIG. 11B, the not-shown first positive pressure applying means applies a positive pressure P1 (first positive pressure) to the inside of the parison S in the first mold 3 and second mold 4. As a result, the parison S is pressed against and transferred to the molding portions 3*a*, 4*a* of the first mold 3 and second mold 4. Also, the not-shown second positive pressure applying means applies a positive pressure P2 (second positive pressure) to the outside of the parison S in the recesses 3*d*, 4*d* (see FIG. 7) of the first mold 3 and second mold 4. As a result, the parison S is shaped along the neck portion 6*c* of the internal component 6 (see FIG. 9). Note that there is no particular limitation on the method and order of applying the positive pressures P1 and P2. It is preferable that the positive pressure P2 is set higher than the positive pressure P1.

<Parison Cooling Process>

Next, as shown in FIG. 11C, cooling air C is circulated inside the first mold 3 and second mold 4 using not-shown cooling means. As a result, the parison S is cooled and cured.

<Mold Opening Process>

Next, as shown in FIG. 11D, the first mold 3 and second mold 4 are opened and the molded product U is taken out. Then, by cutting off unnecessary burrs formed at both ends, the fuel tank T (see FIG. 1) is completed.

Figure 12:
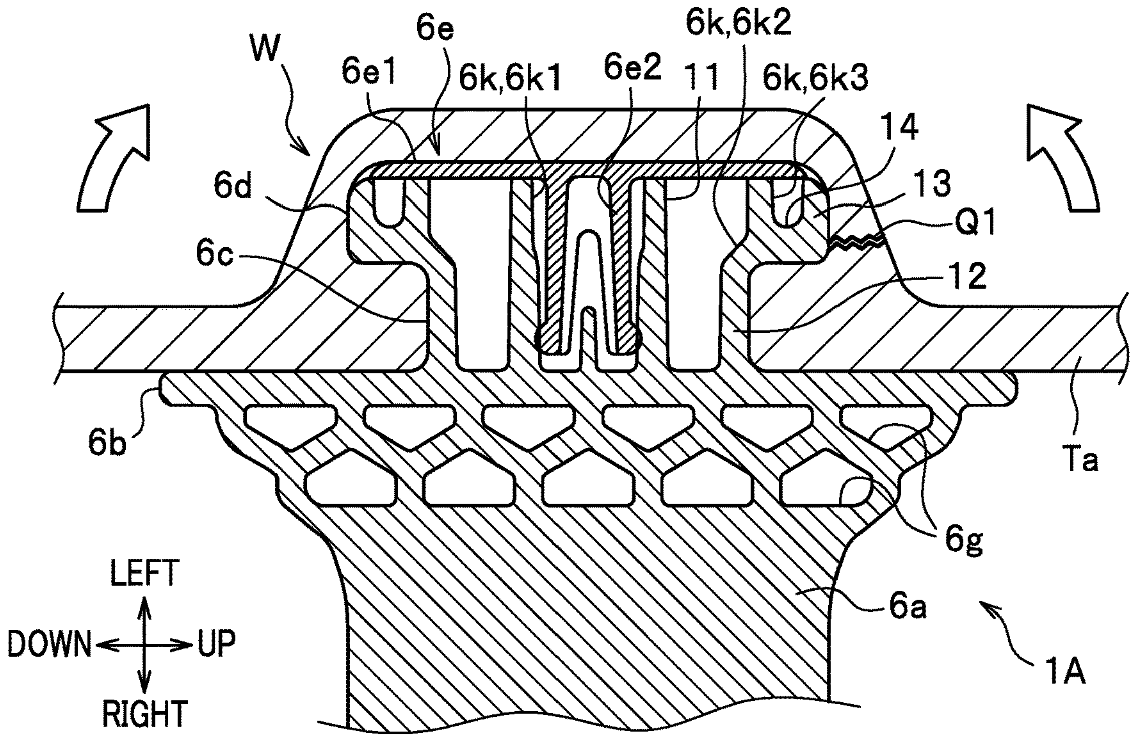
FIG. 12 is a sectional view which shows an action of a conventional fuel tank.

Here, FIG. 12 is a cross-sectional view showing the operation of a conventional fuel tank. In the case where no “fuse-shaped portion” is provided as in the conventional fuel tank, when a predetermined positive pressure acts inside the fuel tank 1A, a force will act such that the wall portion of the tank main body Ta extending around the head portion 6*d* rolls up towards the head portion 6*d* (see the bold arrows in FIG. 12). As a result, for example, there is a possibility that the area, near the head portion 6*d*, of the wall portion of the tank main body Ta may be broken at the breakage portion Q1.

Figure 13:
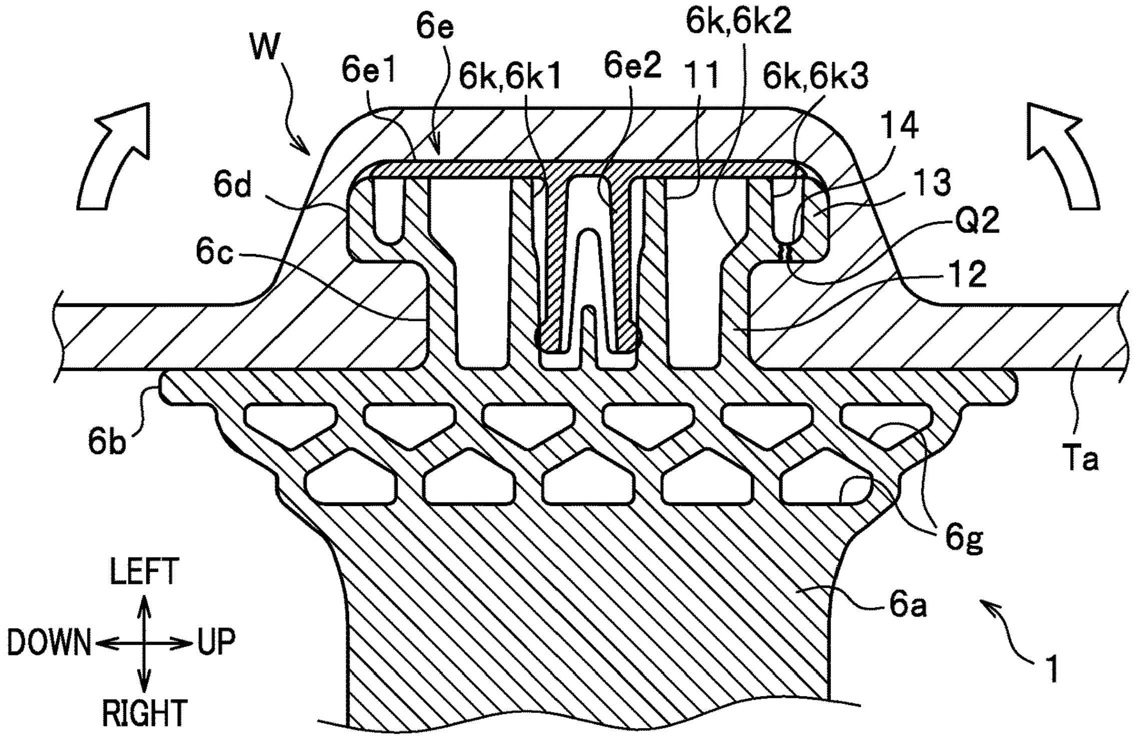
FIG. 13 is a sectional view which shows an action of a fuel tank according to the embodiment.
Figure 14:
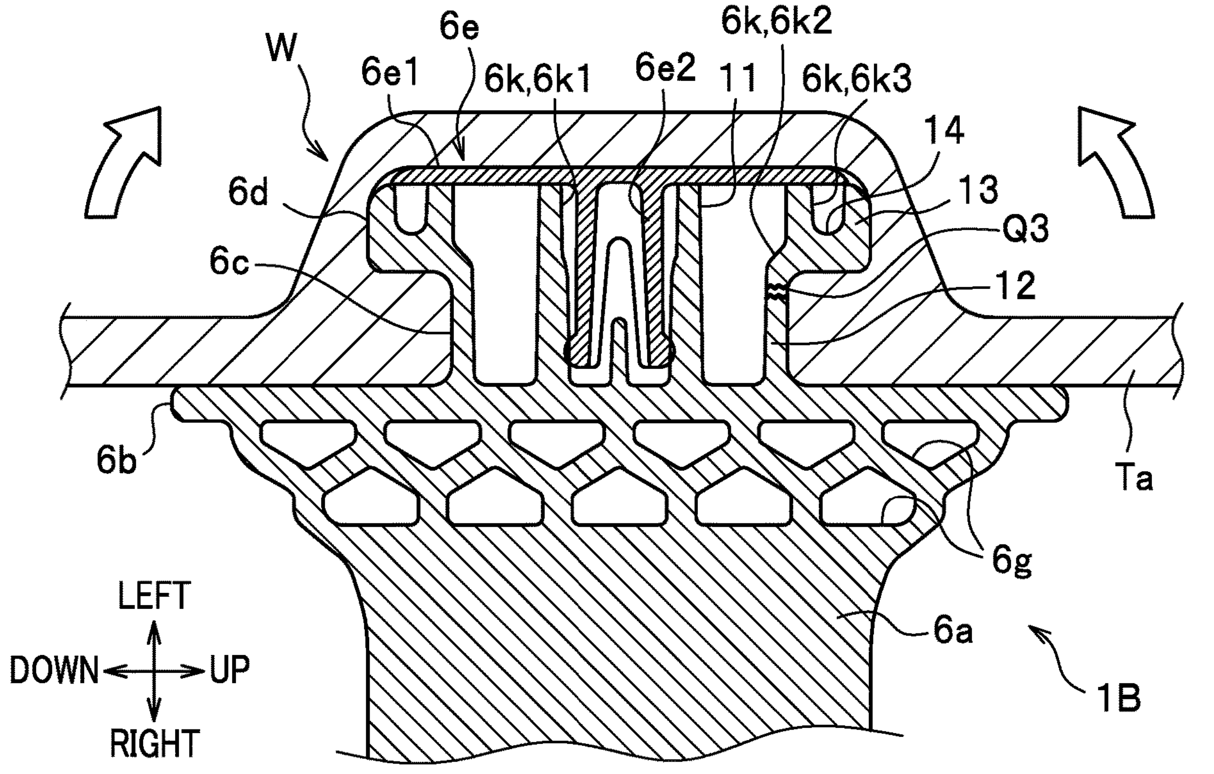
FIG. 14 is a sectional view which shows an action of the fuel tank according to a modification.

In contrast, as shown in FIG. 13, in the present embodiment, by having a bottom portion 14 (fuse-shaped portion), it is possible to break the internal component 6 at the breakage portion Q2 of the head portion 6*d*. As a result, the broken head portion 6*d* remains on the wall portion of the tank main body Ta, and the other portions can be separated from the wall portion of the tank main body Ta, thereby preventing damage to the wall portion of the tank main body Ta.

Furthermore, the head portion 6*d* has multiple cutout portions 6*k* opening to the end surface of the head portion 6*d*, and the bottom portion 14 (fuse-shaped portion) is formed on radially outer side of the head portion 6*d* and continuously with the third cutout portions 6*k*3. This makes it possible to easily form the fuse-shaped portion by adjusting the thickness of the bottom portion 14 using the third cutout portions 6*k*3.

Also, according to the present embodiment, by providing a cap member 6*e* on the head portion 6*d* of the internal component 6, it is possible to prevent the parison S from entering the cutout portions 6*k* during molding. Therefore, it is possible to reduce the variation in thickness of the parison S and prevent the barrier layer from getting broken or damaged.

Furthermore, in the shoulder portion 6*b*, since a communication portion (not shown) penetrating in the height direction is formed, it is possible to flow the air in the gap 6*j* from the communication portion 6*m* into the cutout portions 6*k*, and discharge the air in the cutout portions 6*k* from the communication portion (not shown) into the tank main body Ta. As a result, it is possible to reliably perform air removal, and it is possible to securely shape the parison around the neck portion 6*c*.

[Modification]

Next, a fuel tank 1B according to a modification of the present invention will be explained. In the modification, the position of the fuse-shaped portion is different from the above-described embodiment, so that the explanation will focus on the differences.

In the modification, a "fuse-shaped portion" is set on the second side wall 12, which continues with the second cutout portions 6*k*2. That is, by reducing (thinning) the wall thickness of the second side wall 12, when a predetermined positive pressure is applied to the fuel tank 1B, it is designed to be broken at the breakage portion Q3 of the second side wall 12. In other words, the neck portion 6*c* is formed to be broken. In this case as well, the wall thickness of the second side wall 12 remains consistent in the circumferential direction. Thus, the "fuse-shaped portion" may be provided on the neck portion 6*c* (second side wall 12). In this way, an effect substantially equivalent to the aforementioned embodiment can be obtained.

The embodiments and modifications of the present invention have been described above, but design changes can be made as appropriate without departing from the spirit of the present invention. For instance, the "fuse-shaped portion" can be provided in other portions as long as it can be broken near the boundary between the head portion 6*d* and the neck portion 6*c*, either within the head portion 6*d* or the neck portion 6*c*. The "fuse-shaped portion" can be provided on both the bottom portion 14 and the second side wall 12, or on the third side wall 13. Also, in the present embodiment, the parison is wrapped around the neck portion by positive pressure from the outside of the parison (blow molding) to fix the internal components, but other molding methods may be used. Additionally, the cap member 6*e* can be omitted.

REFERENCE SIGNS LIST

6 internal component
6*a* torso portion
6*b* shoulder portion
6*c* neck portion
6*d* head portion
6*e* cap member
6*k* cutout portion
11 first side wall
12 second side wall
13 third side wall
14 bottom portion (fuse-shaped portion)
15 rib
S parison
T fuel tank
Ta tank main body

The invention claimed is:

1. A fuel tank comprising:

an internal component including a head portion, a neck portion, and a shoulder portion, the internal component being fixed on a tank main body by shaping a parison to the head portion, the neck portion and the shoulder portion during molding of the tank main body, wherein at least one of the head portion and the neck portion includes a fuse-shaped portion to be broken near a boundary between the head portion and the neck portion, wherein the head portion includes multiple cutout portions of recesses opening to an end surface of the head portion, and wherein the head portion includes a thinned bottom portion of the fuse-shaped portion positioned under a cutout portion of the multiple cutout portions, wherein the fuse-shaped portion is disposed on radially outer side of the head portion and continuously with the multiple cutout portions.

2. A fuel tank comprising:

an internal component including a head portion, a neck portion, and a shoulder portion, the internal component being fixed on a tank main body by shaping a parison to the head portion, the neck portion and the shoulder portion during molding of the tank main body, wherein at least one of the head portion and the neck portion includes a fuse-shaped portion to be broken near a boundary between the head portion and the neck portion, wherein multiple cutout portions of recesses are formed to communicate from the head portion to the neck portion and open to an end surface of the head portion, wherein the neck portion includes a thinned side wall of the fuse-shaped portion positioned radially outside of a cutout portion of the multiple cutout portions, and wherein the fuse-shaped portion is disposed on radially outer side of the neck portion and continuously with the cutout portion.

3. A fuel tank comprising:

an internal component including a head portion, a neck portion, and a shoulder portion, the internal component being fixed on a tank main body by shaping a parison to the head portion, the neck portion and the shoulder portion during molding of the tank main body, wherein at least one of the head portion and the neck portion includes a fuse-shaped portion to be broken near a boundary between the head portion and the neck portion, wherein the head portion includes a thinned bottom portion of the fuse-shaped portion, and a side wall standing from the thinned bottom portion, and wherein the thinned bottom portion has a constant thickness in a circumference direction.

4. A fuel tank comprising:

an internal component including a head portion, a neck portion, and a shoulder portion, the internal component being fixed on a tank main body by shaping a parison to the head portion, the neck portion and the shoulder portion during molding of the tank main body, wherein at least one of the head portion and the neck portion includes a fuse-shaped portion to be broken near a boundary between the head portion and the neck portion, wherein the neck portion includes a thinned side wall of the fuse-shaped portion, and wherein the thinned side wall has a constant thickness in a circumference direction.

* * * * *